3,139,370
APPARATUS FOR EVAPORATION AND DRYING OF RADIOACTIVE SAMPLES
Charles Christianson, New York, N.Y., and Ralph C. Maggio, Fort Lee, N.J., assignors to the United States of America as represented by the Secretary of the Navy
Filed May 9, 1961, Ser. No. 108,962
1 Claim. (Cl. 159—32)
(Granted under Title 35, U.S. Code (1952), sec. 266)

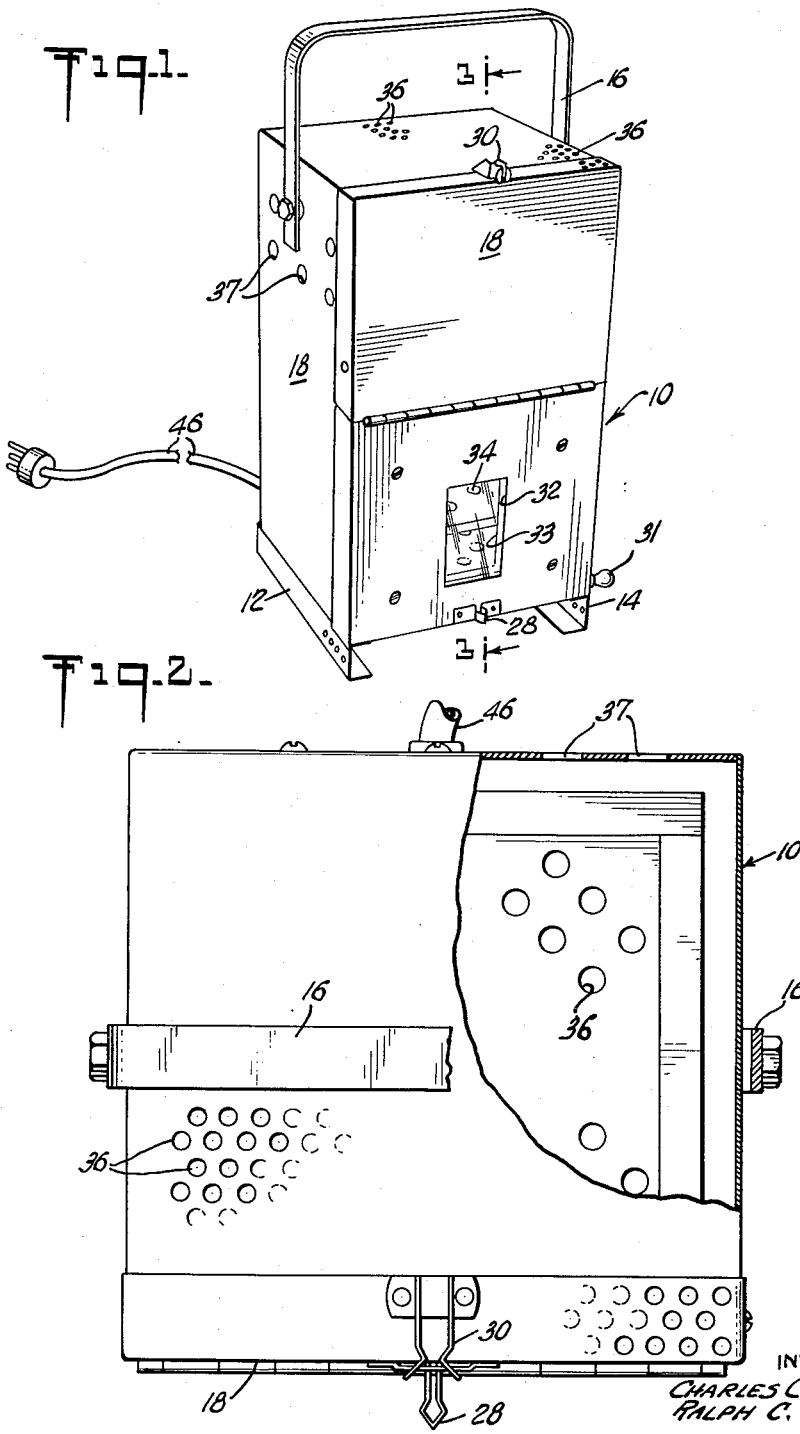

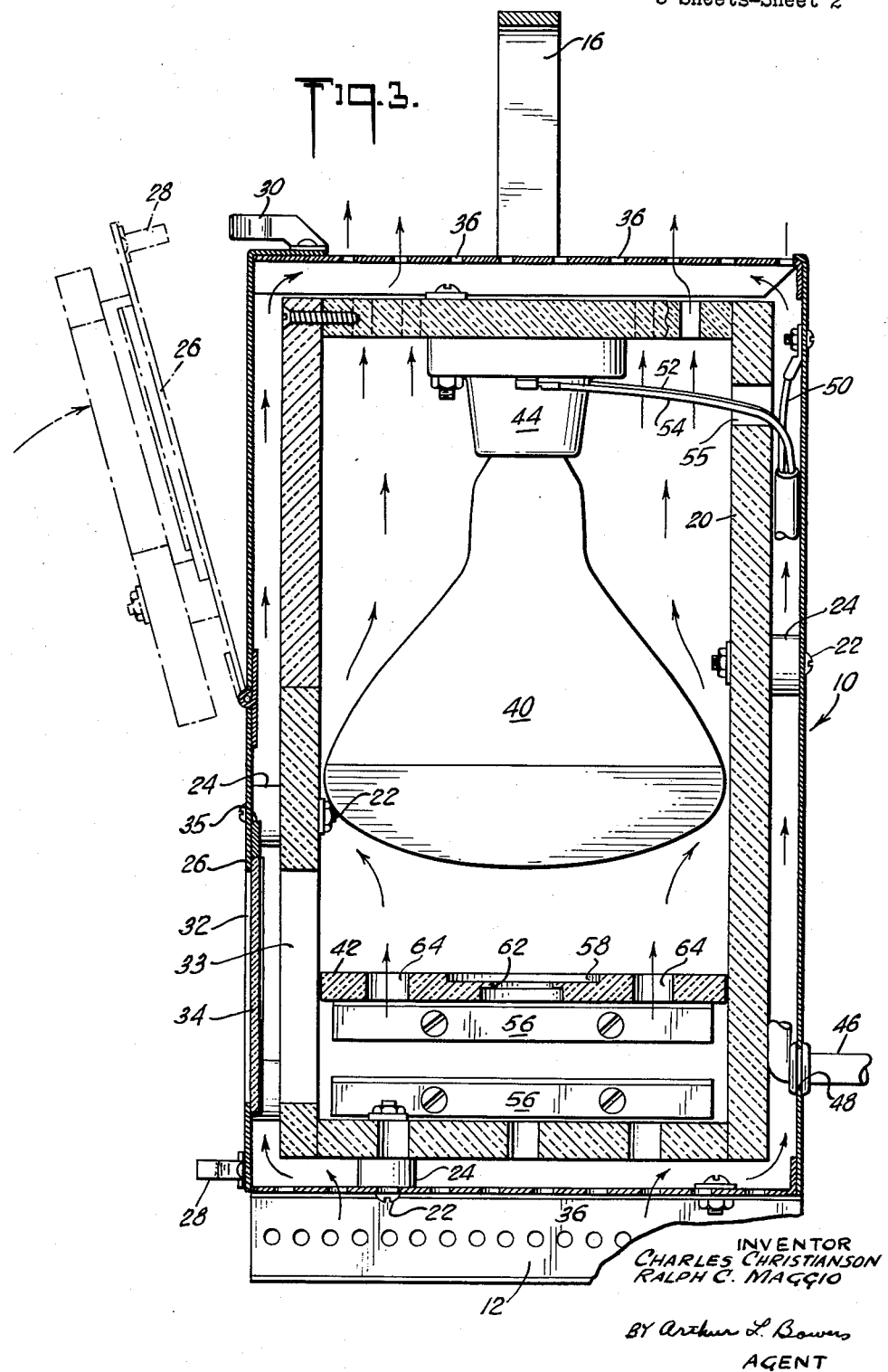

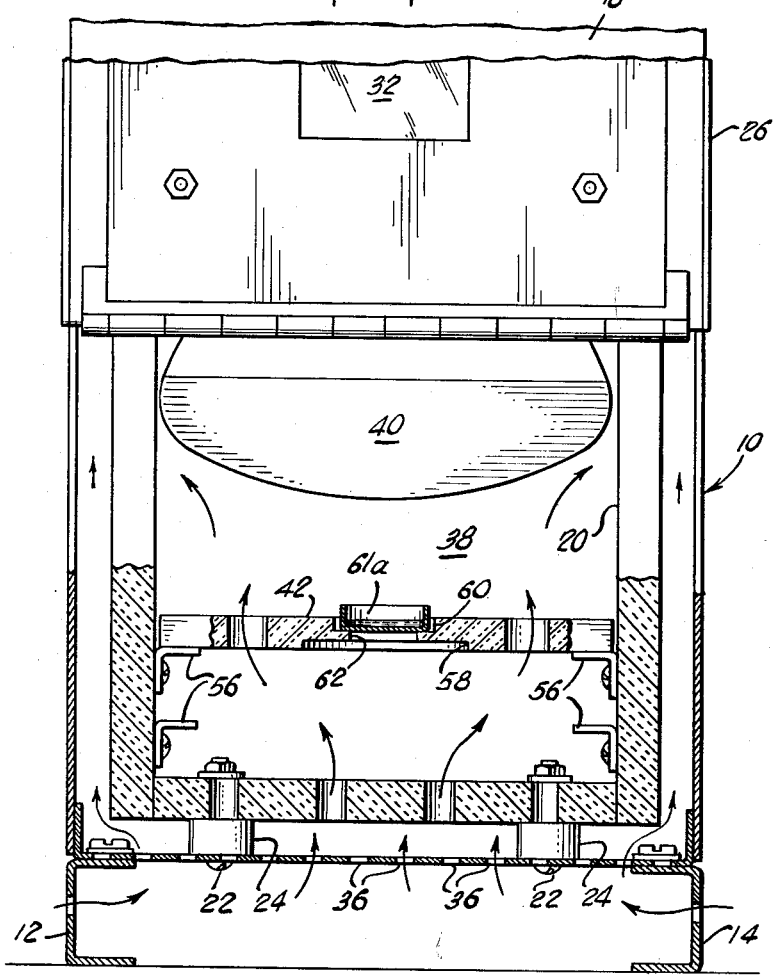
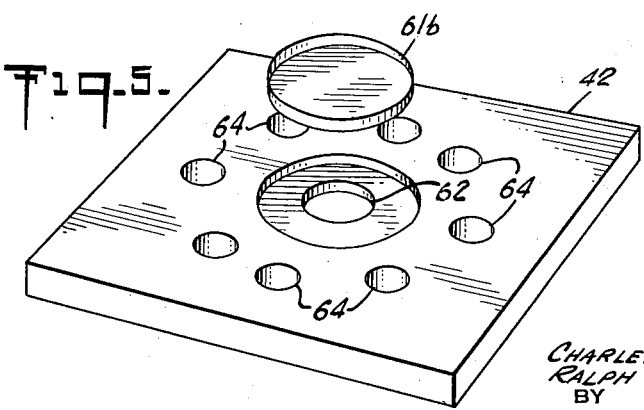

The invention described herein may be manufactured and used by or for the Government of the United States of America for governmental purposes without the payment of any royalties thereon or therefor.

This invention relates to measuring radioactivity and more particularly to measuring accurately the radioactivity in the solid matter contained in a specific sample quantity of water or other liquid.

To make accurate radioactivity measurements on the solids contained in water or another liquid, it is necessary to separate from an accurately measured quantity of the liquid all the solid matter contained therein, to deposit all the solid matter in a configuration suitable for application to radioactivity measuring instruments or counters.

In order to measure or count the radioactivity in an aqueous solution, it is necessary to draw or collect an accurately measured quantity of the aqueous solution and then separate from the measured quantity all the particulate or dissolved solid matter therein because the water molecules are not radioactive and the water attenuates radiation from the solid matter. However, in separating the solid matter from the water and depositing the solid matter in a configuration such as a disk shaped film or other which is suitable for radioactivity measurement, none of the solid matter should be lost else the count registered by the measuring instrument will be lower than the true level of radioactivity in the measured quantity of the aqueous solution. Boiling the solution to drive off the water is unsatisfactory because a substantial percentage of water is driven off as droplets and the droplets carry off some of the solid matter. Additionally, if all or a significant percentage of the radioisotopes in the aqueous solution are of the short-lived type, the solid matter must be separated and dried as quickly as possible after the sample is taken in order to minimize error in a radioactivity measurement as of the time the sample was taken. The need for these measurements arise in laboratory experiments in medical diagnosis, in monitoring nuclear reactor aqueous coolant, in monitoring drinking water supplies and in other situations wherein liquids or semi-solids contain some radioactive solids.

Monitoring measurements on reactor coolant and on drinking water supplies in the vicinity are made periodically around the clock. Therefore the measurement procedure should be easy to carry out, practical, inexpensive and safe. Furthermore, an equipment for the purpose for use on board ship should be portable and convenient and easy to use even by non-scientific personnel.

An object of this invention is to extract from a wet radioactive sample or from a sample of radioactive liquid all the solid matter contained therein.

A further object is to extract from a wet radioactive sample or from a sample of a radioactive liquid in the shortest possible time all the solid matter contained therein and to repeatedly duplicate the time on like samples to achieve standardization and repeatability.

A further object is to extract in a few minutes from about a two cubic centimeter sample of a radioactive aqueous fluid all the solute and particulate matter contained therein.

A further object is to provide a device that is compact, manually portable in one hand, so that it can be carried by one man through constricted walkways, easy to use, comparatively inexpensive, practical, and safe for use in extracting and depositing on a selected surface suitable for application to a radioactivity measuring instrument all the solid matter contained in a sample of a radioactive aqueous fluid and in a period of time on the order of a few minutes.

Other objects and many of the attendant advantages of this invention will be readily appreciated as the same becomes better understood by reference to the following detailed description when considered in connection with the accompanying drawings wherein:

FIG. 1 is a perspective view of an embodiment of this invention,

FIG. 2 is a top plan view of FIG. 1 on a larger scale and partly broken away to show the inner and outer walls and the perforations in the upper walls, FIG. 3 is a longitudinal section taken along line 3—3 of FIG. 1 and on approximately the same scale as in FIG. 2, FIG. 4 is a front view of the lower two-thirds of the embodiment shown in FIG. 1 on approximately the same scale as FIGS. 2 and 3 and with the door in open position and with a bottom portion thereof broken away in vertical section, FIG. 5 is a perspective view of a specimen support and planchet designed for seating on brackets at the lower end of the inside of the structure.

In the embodiment shown in the drawings there is shown an elongated double-walled box-like container 10 having an approximately one-half inch included air space all around the container walls. Legs 12 and 14 are fastened to one end of the container for seating the container in an upright position about one inch above a support surface to permit air to flow freely to the bottom of the container. A handle 16 is attached to the other end of the container. The outer wall 18 of the container is of rigid metal sides and ends spot-welded together. The inner wall 20 of the container is of heat insulating boards screw-fastened together; various commercially marketed heating insulating board materials containing asbestos, e.g., Transite, one-half inch thick is suitable. The inner and outer walls are rigidly joined by a plurality of bolt fastenings 22, each extending through a pair of aligned holes in the inner and outer walls and through a spacer collar 24 of heat insulating material about one-half inch long between the walls. The bottom half of one side of the container is formed as a hinged access door 26 and with a latch 28, 30, that may be used to retain the door in open position. A door knob 31 of heat insulating material is secured to one end of the door to facilitate movement of the door when the temperature inside the container is high. The inner and outer wall portions of the door are formed with aligned window openings 32 and 33; a transparent window 34 of oven glass is mounted in a frame 35 surrounding the window opening in the outer wall of the door. At top and bottom of the container the inner and outer walls are formed with distributed perforations 36 and the perforated area is made as large as possible consistent with strength and rigidity. The sides and rear walls are formed with several distributed perforations 37 near the top of the container.

In the container chamber 38 there is mounted at the upper end a reflecting radiant heat lamp 40 of about 250 watts to radiate toward the opposite end of the chamber. A speciment support 42 is located near the bottom of the chamber. The lamp 40 is mounted in a lamp socket 44 which is affixed to the inner wall of the upper end of the container. Power for the lamp 40 is obtained through a 3-wire electric cable 46 threaded through an opening 48 in the rear outer wall near the bottom of the container. The cable extends upward through the rear air space and near the upper end of the container the three wires divide; one wire 50 is secured to the outer metal wall for grounding the outer wall and the other two wires 52 and 54 are threaded through a hole 55 in the upper rear of the inner wall and are electrically connected to the lamp socket terminals. At the bottom of the chamber, angle brackets 56 are secured to the inner walls to seat the specimen support 42 at one of two distances from the lamp 40 and accessible when the door 26 is in open position.

The specimen support is of heat insulating board about one-half inch thick and having approximately the same transverse dimensions as that of the chamber 38 and formed centrally with a pair of aligned recesses 58 and 60 in the opposite surfaces for seating two different size circular planchets 61a, 61b. The wall between the recesses is pierced by a hole 62. Around the recesses 58 and 60, the specimen support is formed with a circular series of perforations 64. The comparatively small perforated area minimizes the radiant energy that can reach the bottom of the chamber below the specimen support and that can causes heating of the bottom surface of a planchet seated in the specimen support. The perforations 64 and the clearance around the edges of the specimen support permit sufficient air flow by convection for cooling. The recess 58 can seat a planchet bearing either a small quantity of liquid or a coin sized filter paper after the latter has been used in a filtering or swiping operation. Swiping, as used above, is defined as wiping a surface with a wetted filter paper. The recess 60 is provided to seat a deeper disk planchet for a large quantity of liquid, e.g., two cubic centimeters.

With the container upright, the specimen support in place, the door closed, and the bulb 40 energized, the temperature of the outer wall does not rise suffiicently to be a safety hazard to any one likely to come in contact physically with the outer wall. It was found by experiment with various models that without an air space between the walls on any side, that side becomes so hot as to constitute a safety hazard. Considerable air flow takes place through the chamber when in use simulating a chimney effect; despite the apparent heat around the specimen, the specimen does not become very hot. It was found that an aqueous specimen in the support 40 does not boil or bubble and consequently no part of an aqueous specimen is driven off by spattering. It was postulated that the rapid air flow kept down the specimen temperature rise. The perforations in the upper part of the side walls contribute to keeping down the temperature of the upper part of the side walls during operation. The radiant energy from the bulb 40 progressively vaporizes the liquid from a wet specimen. A 250 watt bulb can vaporize about two cubic centimeters of water in less than ten minutes without loss of any of the solids and can reproduce the results. Because the planchet seated in the specimen support has most of its bottom surface exposed to the air circulating by convection through the container, the residue solids are not burned, charred, or vaporized after the liquid is vaporized and after the remanant solids are dried, particularly if after the residue solids are dry only a few minutes elapse before the specimen is removed from the chamber. For added insurance against damage to the remanent solids, the electric power source can be coupled to the cable 46 through a timer, not shown, for shutting off the power after a time sufficient for evaporation and drying.

It is advantageous to use a selectively variable power supply for the described device. This contributes flexibility and added utility and enables a larger variety of specimens to be dried at temperatures suitable for them.

When radioactivity measurements on an aqueous specimen are required, the disclosed device is carried to the site at which the specimen is obtained. The specimen support 40 is removed from the chamber and with the door 26 closed the cable is connected to its power supply through an extension cord if required. The evaporator is operated for a warm up period of about fifteen minutes so that it arrives at a substantially stable operating condition thereby contributing to repeatability in measurements made at different times. Then a liquid specimen is deposited by pipette or other means in a planchet 61a or 61b for seating in one of the recesses 58, 60 of the specimen support. If the specimen is a coin sized filter paper, e.g., previously used in a filtering or swiping, the filter paper is spread on the surface of a planchet 61a for seating in the recess 58. If the specimen is liquid, a small specimen quantity, e.g., two cubic centimeters is deposited in the deep disk planchet for seating in recess 60. The specimen does not fill the planchet to insure against spillage. Alternatively, the specimen is deposited in the planchet after the planchet is seated in the specimen support. The planchet must be free of radioactive contaminants before a specimen is deposited therein. The hole between the recesses in the specimen support facilitates placement and removal of the planchet as well as exposing the bottom of the planchet to cooling air. Then the door is opened, the specimen support is slid onto the upper or lower angle members 56 and the door is closed. The specimen may be observed through the window and removed from the container as soon as possible after it is dry or it may be removed after a certain number of minutes based upon prior experience with like samples. After the specimen support is removed from the chamber, the specimen container is unseated easily by inserting a finger through the opposite face of the specimen support, and inserted in a measuring instrument or counter as shown in our copending application Serial Number 97,978, filed March 23, 1961, now Patent 3,109,099.

Three important features of this invention are that radiant heating is directed down on the wet sample to produce surface evaporation; convection cooling is used to prevent the temperature around the specimen from rising high enough to cause loss of solids due to droplets driven off by boiling or spattering of the specimen, and substantially identical conditions are encountered by each sample. These features enable repeatable results to be obtained and measurement procedures to be carried out faster than heretofore.

Variation in the design of the intensity of the radiant heat source, the quantity of the specimen, the size of the chamber, the number, size and distribution of the perforations can be introduced without departing from the scope of this invention. The top and bottom of the inner walled container may be metal to reduce weight.

It is advantageous to select a specimen quantity as small as possible because the length of time between sampling and counting is dependent upon the size of the specimen and the length of time is important to the efficiency of the technician and may be important to the accuracy of measurement. In a specimen containing radioactive isotopes the isotopes may all be short-lived, all long-lived or a mixture. When the isotopes are all long-lived, the length of time for carrying out a measurement procedure, whether a few minutes or an hour, is not significant to the accuracy of the measurement. However, if a portion of the isotopes is short-lived, having a half-life on the order of a half hour more or less, the length of time required for carrying out the measurement procedure is important to the accuracy. Since there is no way to carry the measurement procedure in zero time, the next best thing is to carry out the measurement as quickly as possible after sampling. Reducing the quantity of specimen saves time in the measurement procedure. The converse also applies when the specimen contains short-lived radioisotopes because a reduction in time between sampling and counting insures a higher intensity level when counting. However, several factors indicate a lower limit to the quantity of specimen. First, it is not possible to mete out accurately measured minute quantities of liquid or semi solids quickly in the field outside a laboratory. A pipette is a convenient device for meting out several cubic centimeters of a liquid but error rises rapidly in meting out quantities less than about two cubic centimeters with a pipette. Secondly the intensity of radioactivity may be too low for an accurate count from a small specimen. Thirdly, where the specimen is very small, accidental inclusion of minute foreign contaminants in the sample can have an appreciable effect on the measurement. This invention has enabled the use of smaller specimens than heretofore with accurate results. Two cubic centimeters is a quantity of specimen that has been satisfactory for use in monitoring water coolant of nuclear reactors.

In addition to minimizing the time required for a measurement procedure, this invention standardizes the time for successive measurements on like specimens and imparts repeatability to measurements on identical specimens. For example, assume that the coolant of a nuclear reactor is tapped each hour for a count. Substantial percentage changes in counts is successive specimens are significant in that they indicate changes in the functioning of the reactor. If successive measurement procedures and setups differ appreciably, there may be differences in the counts though there is no actual change in the reactor coolant; the converse also is true. With like specimens, this invention separates the solids from the liquid in substantially the same short period of time for each of the successive specimens, and enables measurement procedures on the successive specimens to be completed in substantially equal lengths of time. This makes more meaningful the comparison of counts on successive specimens.

Obviously many modifications and variations of the present invention are possible in the light of the above teachings. It is therefore to be understood that within the scope of the appended claim the invention may be practiced otherwise than as specifically described.

We claim:

A small, portable, externally cool operating unit for evaporating all the water and drying the solid residue of a two cubic centimeter quantity of a sample of aqueous coolant of a nuclear reactor in a time interval on the order of ten minutes to enable accurate periodic monitoring of the reactor coolant of radioactivity in the coolant where at least part of the coolant residue my be a radioisotope having a half-life that is less than half an hour and without loss of any significant percentage of the solid matter originally contained in the sample, comprising an elongated box of a length on the order of one foot, said box having a pair of side walls, front and rear walls, a top end wall and a bottom end wall, the latter being spaced apart lengthwise of the box, all of said walls being double walls with inner and outer wall portions with an air space within and throughout each of the double walls, at least the inner wall portions of the side walls and front and rear walls being of a heat insulating material and the outer wall portions being of rigid comparatively thin metal, legs on the bottom end wall of said box for seating said box with its length dimension vertical and with clearance below its bottom for exposing the bottom to the atmosphere, part of the front wall of said box adjacent the bottom end wall forming a door, a seat for a specimen support shelf in the inside of said box near the bottom end wall and accessible when said door is opened, a closely-fitted specimen support shelf removably supported on said seat transverse to the length of the box and having perforations through its thickness dimension, said specimen support having a recess for seating a planchet containing a wet specimen, said shelf being formed with a hole therethrough coaxial with said recess to expose most of the bottom surface of said planchet seated in said recess, a lamp socket secured to the top end wall with its axis oriented lengthwise of the box, a reflecting infrared electric lamp of about 250 watts secured in said socket and extending lengthwise of the box toward said shelf to radiate heat toward said shelf, both end walls of said box being perforated to permit air circulation by convection from the bottom end to the top end generally lengthwise through said box around the bottom of the planchet in the specimen support shelf and lamp and through the air space within the double walls of said box when the box is seated on its legs and oriented vertically, the side walls of said box being perforated near the top end wall.

References Cited in the file of this patent

UNITED STATES PATENTS

| | | |
|---|---|---|
| 2,478,001 | Miskella | Aug. 2, 1949 |
| 2,549,619 | Miskella | Apr. 17, 1951 |
| 2,594,743 | Dietert et al. | Apr. 29, 1952 |
| 2,931,267 | Gardner | Apr. 22, 1958 |

FOREIGN PATENTS

| | | |
|---|---|---|
| 251,168 | Switzerland | July 16, 1948 |
| 180,573 | Austria | June 15, 1952 |